Sept. 24, 1968          G. EHRENBERG          3,403,311
LINEAR INDUCTION MOTOR FOR SLIDE WIRE POTENTIOMETERS
AND SERVO SYSTEMS
Filed Aug. 31, 1964          2 Sheets-Sheet 1
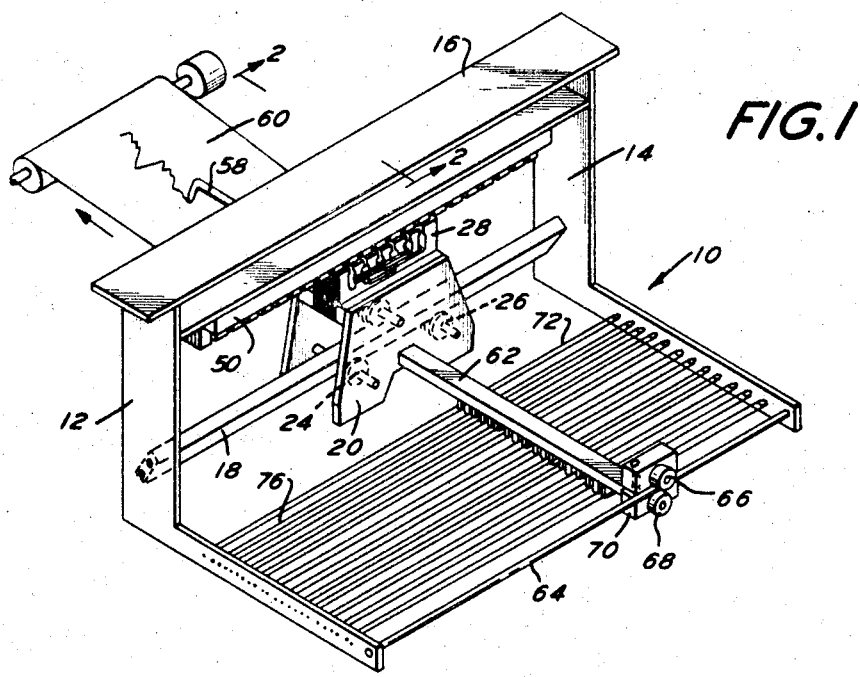
FIG. 1
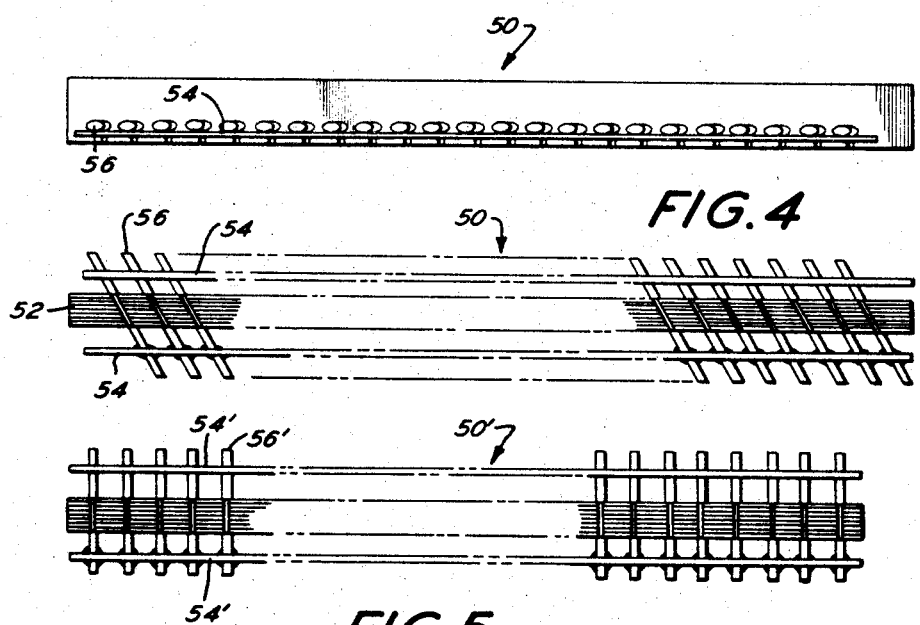
FIG. 3
FIG. 4
FIG. 5
INVENTOR.
GUSTAVE EHRENBERG
BY Seidel & Gonda
ATTORNEYS.

Sept. 24, 1968    G. EHRENBERG    3,403,311
LINEAR INDUCTION MOTOR FOR SLIDE WIRE POTENTIOMETERS
AND SERVO SYSTEMS
Filed Aug. 31, 1964    2 Sheets-Sheet 2

INVENTOR.
GUSTAVE EHRENBERG
BY Seidel & Gonda

ATTORNEYS.

United States Patent Office 3,403,311
Patented Sept. 24, 1968

3,403,311
LINEAR INDUCTION MOTOR FOR SLIDE WIRE POTENTIOMETERS AND SERVO SYSTEMS
Gustave Ehrenberg, Havertown, Pa., assignor, by mesne assignments, to Electro-Nite Co., a corporation of Pennsylvania
Filed Aug. 31, 1964, Ser. No. 393,086
10 Claims. (Cl. 318—22)

ABSTRACT OF THE DISCLOSURE

A precision linear induction motor for moving the contact of a slide wire potentiometer in servo systems. High precision and accuracy are obtained by providing a uniform small air gap throughout the entire length of displacement of the movable stator relative to the fixed armature. Adjustable means are provided for limiting the amount by which the stator approaches the armature and maintaining a uniform air gap.

---

In general, this invention relates to a new and improved linear induction motor.

A linear induction motor is one which has its stator pole pieces placed adjacent to one another along a straight line. This is contradistinction to a rotary induction motor which has its pole pieces placed adjacent to one another along a curved surface which folds back on itself to form a circle. In place of a standard squirrel cage rotor of the rotary induction motor, a linear induction motor built in accordance with the principles of the present invention will utilize a stationary armature having flat pole pieces juxtaposed to a stator having flat pole pieces with a horizontal gap. The provision of a horizontal gap with a stator capable of moving toward and away from the armature facilitates more accurate control of the gap than can be attained by any other motor.

The stator is mounted for reciprocal movement with only line contact for its support so as to reduce friction and provide a sensitive motor. The stator windings are provided in a manner to cause a traveling field. The motor is coupled to an instrument such as a recorder and a slide wire device as will be explained in greater detail hereinafter.

It is the general object of the present invention to provide a new and improved linear induction motor.

It is another object to provide a small, inexpensive, lightweight linear induction motor wherein a permanent record may be attained in response to relative movement directly between the armature and stator.

It is another object of the present invention to provide a novel linear induction motor having a stator coupled to a slide wire device and a recorder.

Other objects will appear hereinafter.

For the purpose of illustrating the invention, there is shown in the drawings a form which is presently preferred; it being understood however, that this invention is not limited to the precise arrangements and instrumentalities shown.

FIGURE 1 is a perspective view of the motor, slide wire device and meter.

FIGURE 3 is a side elevation view of the fixed armature.

FIGURE 4 is a bottom plan view of the fixed armature.

FIGURE 5 is a bottom plan view similar to FIGURE 4 but illustrating another embodiment.

Figure 2:
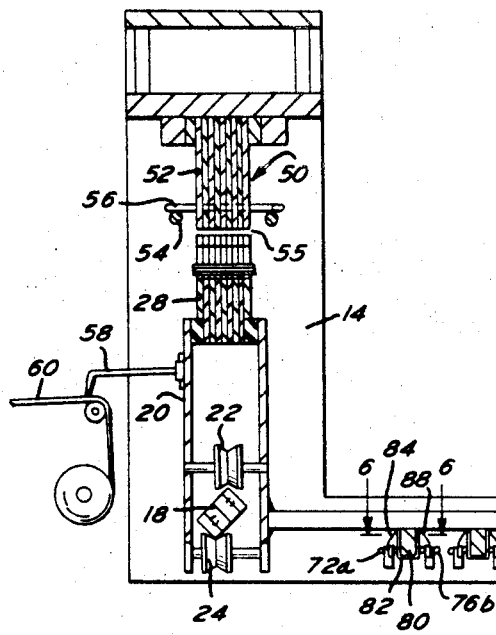
FIGURE 2 is a sectional view taken along the line 2—2 in FIGURE 1.

Referring to the drawing in detail, wherein like numerals indicate like elements, there is shown a servomechanism 10 for recording a measured value. The servomechanism 10 includes a linear induction motor built in accordance with the present invention. The motor includes a pair of spaced frames 12 and 14 interconnected across their upper ends by a coupling member 16 and at their lower ends by a carriage track 18 of nonmagnetic material. A stator carriage 20 is reciprocally supported by a bottom surface of track 18 with point contact.

As shown more clearly in FIGURES 1 and 2, the stator carriage 20 is provided with an upper bearing 22 above the track 18 and a pair of lower bearings 24 and 26 below the track 18. The track 18 is rectangular in cross section and positioned so that its major faces are at an angle with the horizontal. The bearings are concave and tapered at an angle greater than the angle between any two adjacent intersecting faces of the track 18. In FIGURE 2, the stator carriage 20 is in its operative disposition wherein only the lower bearings 24 and 26 are in contact with the carriage track 18. In the inoperative position of the carriage 20, only the bearing 22 is in contact with the track 18.

The motor is provided with a laminated stator 28 supported by the carriage 20 with an electrically nonconductive material disposed therebetween. The carriage 20 and the bearings supported thereby are made from a lightweight material which may be nonmagnetic.

Figure 7:
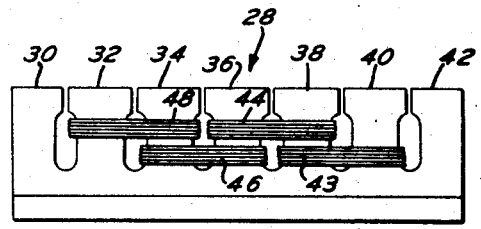
FIGURE 7 is a side view of the movable stator.

The stator 28 is provided with a plurality of poles 30, 32, 34, 36, 38, 40 and 42, as shown more clearly in FIGURE 7. The poles terminate in flat pole faces. A winding 43 extends around the poles 38 and 40. A winding 44 extends around the poles 38 and 36. A winding 46 extends around the poles 34 and 36. A winding 48 extends around the poles 32 and 34. Conductors (not shown) are coupled to the windings in a manner which enables the stator to produce a moving magnetic field along the length thereof which forces the stator to move relative to the armature. Reversal of the phase of one of the stator windings will cause a reversal in movement of the stator with respect to the armature. Thus, the stator may be controlled for reciprocal movement with respect to the fixed armature.

A stationary armature 50 is fixedly supported by the frames 12 and 14 above the stator 28 with a gap 55 therebetween. The gap 55 is horizontally disposed and limited by contact between the track 18 and the lower bearings 24 and 26. The gap 55 may be adjusted by slightly rotating the track 18 about its longitudinal axis. Adjustment of the gap 55 varies the reluctance of the magnetic path and thereby in part controls the rate at which stator 28 moves.

As shown more clearly in FIGURES 3 and 4, the armature 50 includes a plurality of laminations 52 having flat pole faces. Short circuiting bars 54 extend parallel to the laminations 52 and are coupled by armature bars 56 disposed at an angle with respect to the longitudinal axis of the armature. An alternative armature is illustrated in FIGURE 5 with corresponding numerals provided for corresponding elements. The armature 50' is identical with the armature 50 except that the armature bars 56' are perpendicular to the longitudinal axis of the armature.

The carriage 20 is removably coupled to a pen 58 which is adapted to provide a permanent record on the sheet 60 of a recorder. The pen 58 records the movements of the linear induction motor. It will be understood that any type of standard pen and recorder system might be utilized by one practicing the principles of the present invention. The information recorded on sheet 60 may assume a wide variety of forms such as temperature, liquid level, humidity, speed, etc., which vary in accordance with some measured value as will be made clear hereinafter.

The carriage 20 is coupled to a bar 62 at one end of the bar 62. The other end of the bar 62 is coupled to a pair of terminal blocks 70. The terminal blocks 70 are adjustably coupled together and support rotatable bearings. The rotatable bearings are designated as 66 and 68 and are disposed on opposite sides of a horizontally disposed guide rail 64. Guide rail 64 extends between the frames 12 and 14 and is preferably circular in cross section so as to provide line contact with the bearings 66 and 68. Bearings 66 and 68 support bar 62 and stabilize the stator against rocking movement.

As shown more clearly in FIGURE 1, a plurality of slide wires have their ends coupled to the frame 12 and extend around a guide supported by the frame 14. Hence, each of the slide wires is U-shaped. The plurality of slide wires may be provided for correlation with different measured values and utilized as desired. Hence, only slide wires 72 and 76 will be described hereinafter.

Figure 6:
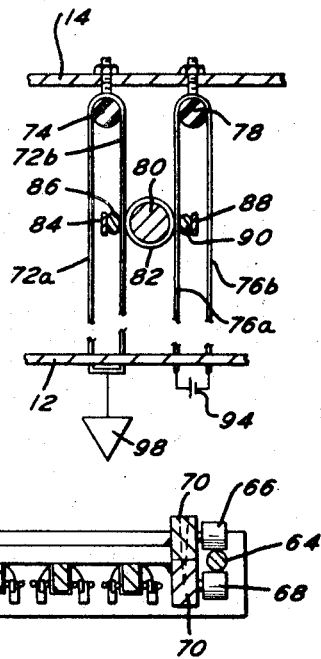
FIGURE 6 is a view taken along the line 6—6 in FIGURE 2.

As shown more clearly in FIGURE 6, slide wire 72 has its terminal ends supported by the frame 12 and short circuited. The slide wire 72 extends around the guide 74 supported by frame 14 so as to divide the wire into portions 72a and 72b. Slide wire 76 likewise has its free ends supported by the frame 12 and extends around the guide 78 thereby dividing the wire into portions 76a and 76b. A contact post 80 on the arm 62 extends between the portions 72b and 76a. Post 80 is provided with a removable contact gap 82 which contacts the portions 72b and 76a. Cap 82 includes springs 84 and 88 having conductors 86 and 90 respectively. The bias pressure of the spring can be as low as one gram. Spring 84 biases conductor 86 which in turn biases portion 72b against cap 82. Spring 88 biases conductor 90 which in turn biases portion 76a against cap 82. Conductors 86 and 90 help to minimize friction and assure good contact.

A power source such as battery 94 is coupled to the terminal ends of the slide wire 76. The slide wires 72 and 76 are preferably made from a commercially available alloy having a high resistance such as 1,525 ohms per foot. As a result thereof, substantially minimal wear will occur, a good definition will be obtained, and extremely little current will be drawn. Further, it will be noted that the springs 84 and 88 bias the portions 72b and 76a of the slide wires toward the cap 82 so that light spring pressures can be utilized without simultaneous bouncing of the contacts or springs.

Figure 8:
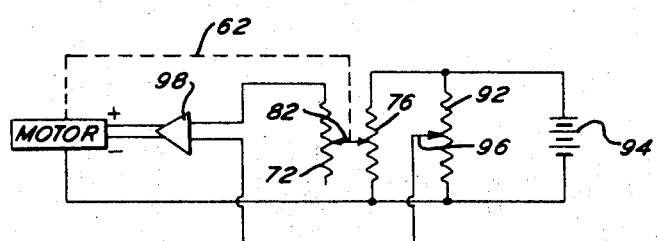
FIGURE 8 is a schematic wiring diagram.

The potentiometer 92 (see FIGURE 8) has a variable contact 96 electrically connected to the input terminal of chopper stabilized amplifier 98. Said chopper stabilized amplifier 98 is well known in the art and commercially available. The movement of contact 96 represents a voltage change originating from any kind of a transducer. The voltage change may represent some measured value such as temperature, liquid level, humidity, speed, etc. The contact gap 82 is electrically coupled to the other input terminal on the amplifier 98 through the slide wire 72. Any voltage developed between the input terminals in the amplifier 98 is an error signal which will be amplified and applied to the windings to the pen 58. This movement will vary the position of the contact cap 82 to return the system to balance so that no error signal occurs between the input terminals of the amplifier 98. It will be understood by those skilled in the art that other types of servomechanisms can be utilized in accordance with the principles of the present invention.

It will be understood that it is not necessary that the linear motor be a two phase motor. It can be any polyphase induction motor or a single phase induction motor with some auxiliary starting means. A continuous slide wire potentiometer is one having infinite resolution.

The present invention may be embodied in other specific forms without departing from the spirit or essential attributes thereof and, accordingly, reference should be made to the appended claims, rather than to the foregoing specification as indicating the scope of the invention.

I claim:

1. A linear induction motor comprising a straight armature having pole pieces along a straight line, a straight stator having pole pieces along a straight line, said pole pieces being made of a magnetic material, said stator and armature pole pieces having flat, opposed pole faces defining a uniform continuous gap therebetween, said stator pole faces being wholly to one side of said armature, a plurality of conductors wound on said stator pole pieces for establishing a moving magnetic field in said gap when energized, said stator being movable along said armature with its pole faces continuously defining said gap with the armature pole faces, and limit means for limiting the movement of said stator toward said armature when said motor is energized, said limit means being continuous along the length of said armature for maintaining a uniform gap between said pole faces while allowing for straight line movement of said stator with respect to said armature, a carriage for said stator, said gap limiting means including a track coextensive of the length of said armature, a bearing on said stator cooperating with said track for guiding said carriage and limiting the movement of said stator pole faces toward said armature, said track being between said bearing and said armature.

2. A motor in accordance with claim 1 wherein said track has point contact with said bearing.

3. A motor in accordance with claim 1 wherein said limit means includes means to adjust the width of said gap.

4. A linear induction motor comprising a straight armature having pole pieces along a straight line, a straight stator having pole pieces along a straight line, said pole pieces being made of a magnetic material, said stator and armature pole pieces having flat, opposed pole faces defining a uniform continuous gap therebetween, said stator pole faces being wholly to one side of said armature, a plurality of conductors wound on said stator pole pieces for establishing a moving magnetic field in said gap when energized, said stator being movable along said armature with its pole faces continuously defining said gap with the armature pole faces, and limit means for limiting the movement of said stator toward said armature when said motor is energized, said limit means being continuous along the length of said armature for maintaining a uniform gap between said pole faces while allowing for straight line movement of said stator with respect to said armature, and mounting means for coupling said stator to a recording instrument for providing a record indicative of the movement of said stator.

5. A linear induction motor comprising a straight armature having pole pieces along a straight line, a straight stator having pole pieces along a straight line, said pole pieces being made of a magnetic material, said stator and armature pole pieces having flat, opposed pole faces defining a uniform continuous gap therebetween, said stator pole faces being wholly to one side of said armature, a plurality of conductors wound on said stator pole pieces for establishing a moving magnetic field in said gap when energized, said stator being movable along said armature with its pole faces continuously defining said gap with the armature pole faces, and limit means for limiting the movement of said stator toward said armature when said motor is energized, said limit means being continuous along the length of said armature for maintaining a uniform gap between said pole faces while allowing for straight line movement of said stator with respect to said armature, and a slide wire potentiometer coupled to said stator.

6. A motor in accordance with claim 5 wherein said slide wire potentiometer is a continuous potentiometer.

7. A motor in accordance with claim 5 wherein the movable contact of the slide wire potentiometer is coupled to said stator by means of a horizontally disposed arm, one end of said arm being mounted on said stator, and means coupled to the other end of said arm for supporting said arm for movement with said stator and for stabilizing said stator.

8. A motor in accordance with claim 5 wherein said slidewire potentiometer includes a slidewire, said slidewire being coupled to said stator by an electrical contact engaging the slidewire along the side thereof, and spring means biasing the contact into engagement with the slidewire so that bouncing of the contact with respect to the potentiometer is eliminated.

9. A motor in accordance with claim 8 including a conductor between said slide wire and spring means.

10. A motor in accordance with claim 8 wherein said contact is a removable cap coupled to said spring means.

References Cited

UNITED STATES PATENTS

| | | | |
|---|---|---|---|
| 3,292,065 | 12/1966 | Fredrickson | 310—15 XR |
| 3,340,540 | 9/1967 | Ehrenberg | 310—13 XR |
| 2,337,430 | 12/1943 | Trombetta | 310—13 |
| 2,889,503 | 6/1959 | Chambers | 318—22 |
| 3,161,848 | 12/1964 | Smith | 338—177 |
| 3,196,347 | 7/1965 | Moyano | 338—116 |

BENJAMIN DOBECK, *Primary Examiner.*